Patented Aug. 6, 1940

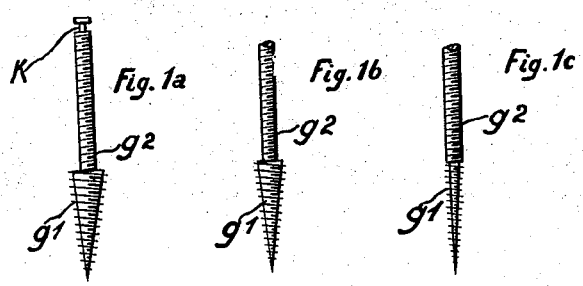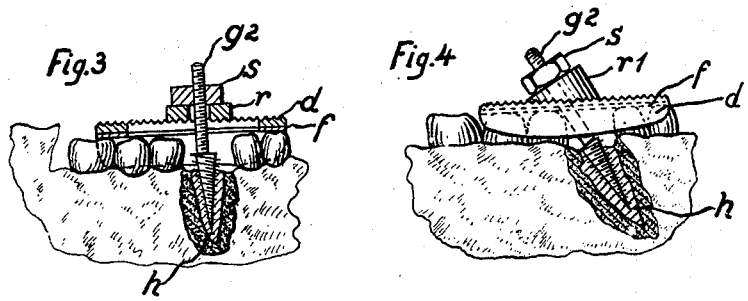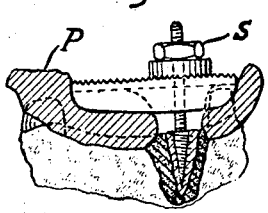

2,210,349

UNITED STATES PATENT OFFICE 2,210,349

INSTRUMENT FOR EXTRACTING TOOTH ROOTS

Peter van Beeck, Berlin, Germany

Application April 20, 1938, Serial No. 203,062
In Germany April 24, 1937

1 Claim. (Cl. 32—61)

This invention relates to an instrument for extracting the roots of teeth with the aid of a screw pin introduced into the tooth root. The instrument enables tooth roots to be extracted without difficulty even in those portions of the mouth which are difficult of access, while at the same time sparing the patient to a maximum extent. Furthermore injuries to the gums and the jaw bone which are unforeseen and greater than is absolutely necessary are avoided.

Hitherto the screw pins used for extracting the roots of teeth were so constructed that the screw pin inserted in the tooth root can be gripped with forceps or with a lever bearing against a counter bearing. When using forceps or a lever the danger of accidentally injuring the patient is great because, when loosening the root out of the gum, the pull exerted on the root is not taken up and the screw pin is so to speak flung out with the root. With the instrument according to the invention the pull exerted on the root is taken up by the portions of the teeth adjacent the diseased root, and the root is lifted only slightly when being detached from the gums.

According to the invention the screw pin introduced into the tooth root has a shank provided with a machine screw thread which shank extends through a support designed to be placed on the teeth and is axially shifted by means of a nut screwed on the shank and bearing against the support. The support comprises a base plate having a slot and one or several washers whose shape is chosen according to the position of the inserted screw pin so that the nut can bear on a surface extending as nearly as possible at right angles to the shank of the screw pin. A bearing surface adapted to the position of the screw pin can be produced by embedding the base plate in a plastic composition surrounding the portion of the set of teeth to be treated and which can be rapidly hardened so that, if the nut is tightened, the base plate can assume the correct position whilst the composition is soft. The root is then extracted after the composition has hardened.

An embodiment of the invention is illustrated by way of example in the accompanying drawing in which Figs. 1a to 1c show in elevation screw pins of different shape and size.

Figs. 2a and 2b are plan views showing two different constructions of the base plate.

Fig. 3 is a vertical sectional view showing the extraction of a perpendicular root.

Fig. 4 is a side elevation showing the extraction of an oblique root.

Fig. 5 shows in side elevation the use of a quick hardening composition as support of the base plate.

The screw pins illustrated in Figs. 1a to 1c are preferably of unhardened steel and have a shank and a conical portion designed to be screwed into the tooth root and which has a screw thread $g'$ similar to that of a wood screw. A machine screw thread $g^2$ is cut in the shank. The size of the screw pin to use is chosen according to the kind of root to be extracted. To facilitate the screwing of the pin into the tooth root with the aid of a drilling machine, the shank of the screw pin may have a notch $k$ for fixing in the angle piece of the drilling machine. A base plate $d$ or $d^1$ (Figs. 2a–2b) is used according to the position of the tooth root to be extracted. The base plate $d$ is intended for the extraction of roots in the front portion of the set of teeth, whereas the base plate $d^1$ is used for extracting the roots of back teeth. The base plates have each a slot $e$ or several slots $e^1$ which allow sufficient clearance for passing the shank of the screw pin through the slot.

The assembly and operation of the instrument is shown in Figs. 3–5.

After the screw pin has been tightly screwed into the previously drilled root duct the base plate $d$ or $d^1$ is laid on the portion of the teeth to be treated with an interposed rubber pad $f$. When using a quick setting composition $p$ according to Fig. 5 the rubber pad can be omitted. The washer $r$ is then slipped on to the shank of the screw pin and the nut $s$ screwed on to the screw thread $g^2$, the opposed faces of the washer $r$ and plates $d$ and $d'$ being serrated for engagement to prevent movements of the screw longitudinally of the plate slot during use of the device. The nut $s$ is turned by hand or with the aid of a wrench until the screw pin anchored in the tooth root $h$ lifts the root out of the jaw. As soon as the root yields the whole instrument can be removed from the mouth.

When extracting oblique roots (Fig. 4) a specially shaped washer $r^1$ is used instead of the washer $r$. This specially shaped washer $r^1$ may, however, be dispensed with if the base plate is embedded as shown in Fig. 5 in a composition $p$ which can be caused to harden quickly, for example the moulding plastic used in dentistry. While the composition is still soft the base plate is automatically brought into position by tightening the nut $s$, so that a bearing surface extending at right angles to the shank is produced for the nut.

I claim:

An instrument for extracting the roots of teeth, comprising a screw pin with a screw threaded portion adapted to be screwed into the tooth root and with a shank provided with a machine screw thread, in combination with an elongated flat supporting plate adapted to be rested on the teeth of the patient adjacent the tooth whose root is to be extracted, and having an elongated slot for the passage of the pin shank, and a nut screwed on to the pin shank and adapted to bear against the upper side of said base plate to axially shift said pin relatively to said plate and an interfitting connection between said nut and plate to restrain the screw against movements longitudinally of the plate slot during use of the device.

PETER van BEECK.